United States Patent
Kümmel et al.

[11] 3,943,788
[45] Mar. 16, 1976

[54] PLANAR GEAR TRAIN

[75] Inventors: Louis Kümmel, Stadtbergen; Rudolf Morhart; Erich Pollak-Banda, both of Augsburg, all of Germany

[73] Assignee: Firma Zahnraderfabrik Renk Aktiengesellschaft, Augsburg, Germany

[22] Filed: Aug. 19, 1974

[21] Appl. No.: 498,367

[30] Foreign Application Priority Data
Aug. 22, 1973 Germany.......................... 2342401

[52] U.S. Cl. ............................................. 74/411
[51] Int. Cl.² ............................................. F16H 57/00
[58] Field of Search ............ 74/443, 410, 411, 412, 74/414, 421 R

[56] References Cited
UNITED STATES PATENTS

| | | | |
|---|---|---|---|
| 2,753,731 | 7/1956 | McWethy | 74/443 |
| 2,869,388 | 1/1959 | Kreis | 74/443 |
| 3,364,771 | 1/1968 | Takahashi | 74/443 X |
| 3,566,710 | 3/1971 | Long | 74/443 |
| 3,673,885 | 7/1972 | Hansen | 74/421 R |
| 3,752,004 | 8/1973 | Hanssen | 74/443 |

*Primary Examiner*—Leonard H. Gerin
*Attorney, Agent, or Firm*—Karl F. Ross; Herbert Dubno

[57] ABSTRACT

A driving and a driven spur gear, lying in a common plane, are operatively coupled with each other through the intermediary of an idler gear in mesh therewith, the idler gear being radially shiftable against a resilient force in the common plane of rotation. The tangent to any tooth flank of both the driving and the driven gear at its point of contact with a tooth of the idler gear includes a pressure angle $\alpha$ with the common diameter of the meshing gears; the angle $\delta$ between the two common diameters should be so chosen that the two tangents are substantially perpendicular to each other, with $\delta - 2\alpha = 90°$ for rotation in one direction and $\delta + 2\alpha = 90°$ for rotation in the opposite direction.

5 Claims, 5 Drawing Figures

PLANAR GEAR TRAIN

FIELD OF THE INVENTION

Our present invention relates to a planar gear train serving for the transmission of a torque from an input shaft to an output shaft via a driving and a driven spur gear, the two shafts being parallel to each other.

BACKGROUND OF THE INVENTION

If two meshing spur gears are perfectly coplanar and free from manufacturing defects, the entrainment of the driven gear by the driving gear will not subject either shaft to flexural stresses. Such perfection, however, is not realizable in practice; thus, even minor irregularities in the tooth profile will give rise to unbalanced forces resulting at least in objectionable noise, especially during high-speed operation.

It has been proposed to remedy this drawback by an elastic mounting of either or both shafts, thereby facilitating a lateral yielding of the corresponding gears in the presence of stresses due to structural irregularities. Such attempts, however, have not been very successful and give rise to additional problems, particularly where large torques are to be transmitted by these shafts.

OBJECTS OF THE INVENTION

The object of our present invention, therefore, is to provide an improved gear train eliminating these inconveniences.

SUMMARY OF THE INVENTION

We realize this object, in accordance with our present invention, by the interposition of an idler gear between the driving and the driven spur gear, this idler gear being so mounted as to be limitedly shiftable in a radial direction within the common plane of rotation of the three meshing gears. Such an arrangement enables the two principal gears, i.e. the driving and the driven spur gear, to be rigid with their respective shafts which in turn can be journaled in ordinary bearings, the shiftability of the idler gear accommodating whatever lateral stresses may occur. In order to hold the teeth of the idler gear securely in mesh with the coacting spur gears, the radial shifting of the idler gear should be resisted by an elastic force. This may be accomplished by a resilient mounting of that gear on a rigid axle; a limited swivelability of the idler gear with reference to the plane rotation may also be desirable.

In accordance with an important further feature of our invention we have found that, for effective suppression of lateral stress components exerted upon the input and/or output shafts, the angular spacing of the two principal gears with reference to the axle of the associated idler gear should be so chosen that the tangent to the active tooth flank of the driving gear at its point of contact with a tooth of the idler gear is generally perpendicular to the tangent of the active tooth flank of the driven gear at its point of contact with another tooth of the idler gear, at the instants when each of the two points of contact lies on a common diameter of the idler gear and the respective principal gear. The angle $\delta$ included between these two common diameters depends on the direction of rotation, being obtuse in one instance and acute in the other. More particularly, with $\alpha$ denoting the angle included between the tangent and the corresponding common diameter, $\delta$ should substantially equal $90° + 2\alpha$ for one direction of rotation (with the teeth of the idler gear moving from the driving to the driven gear over a minor part of a circle) and should substantially equal $90° - 2\alpha$ for the opposite direction of rotation (i.e. with the teeth of the idler gear moving from the driving to the driven gear over a major part of a circle). As the usual value of $\alpha$ is approximately 20°, this calls for $\delta \approx 130°$ in the first case and $\delta \approx 50°$ in the second case; certain deviations from these optimum values are, however, permissible in most instances. For greater flexibility in the relative positioning of the gears, especially with $\delta < 90°$, it is advantageous to make the radius of the idler gear substantially larger than that of the two principal spur gears.

BRIEF DESCRIPTION OF THE DRAWING

The above and other features of our invention will now be described in detail with reference to the accompanying drawing in which.

SPECIFIC DESCRIPTION

Figure 1A:
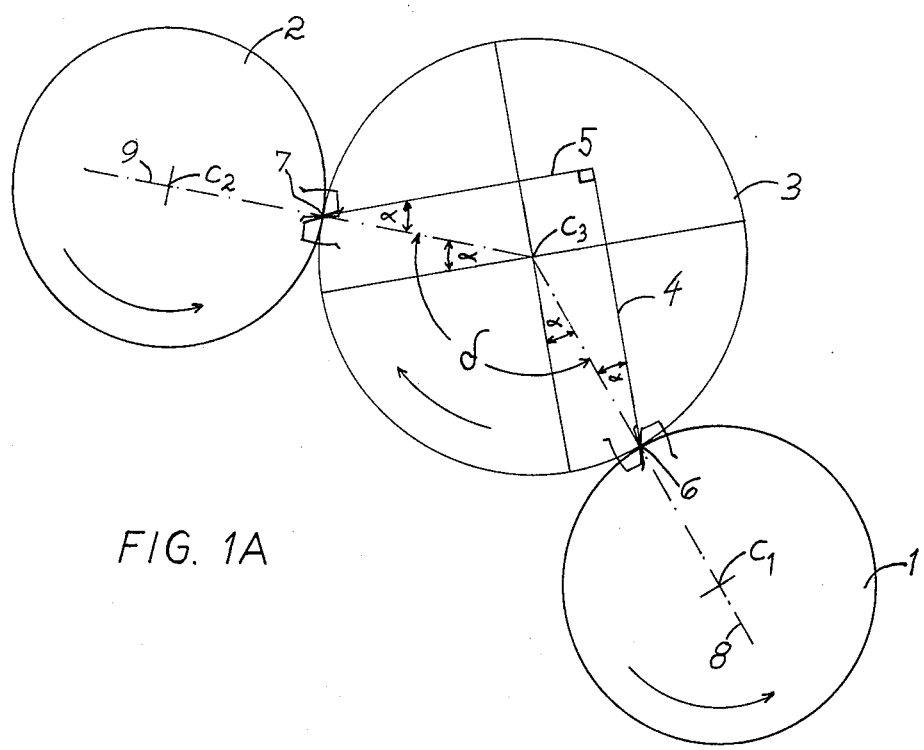
FIGS. 1A and 1B are schematic views of a planar gear train embodying our invention, with opposite directions of rotation.

The planar gear train illustrated in the drawing consists of two principal gears, i.e. a driving spur gear 1 and a driven spur gear 2, meshing with a larger spur gear 3 in a common plane therewith. Gear 3 is an idler and is limitedly shiftable in any radial direction, within the common plane of rotation, against a resilient centering force provided by an elastic mounting as more fully described hereinafter with reference to FIGS. 3 and 4. Gears 1 and 2 are rigid with respective shafts shown in FIG. 3, i.e. an input shaft 21 and an output shaft 22. Inpur shaft 21 is journaled in fixed bearings 24 and is set in rotation by a motor 25; output shaft 22 is journaled in fixed bearings 26 and is coupled to a load 27.

Figure 1B:
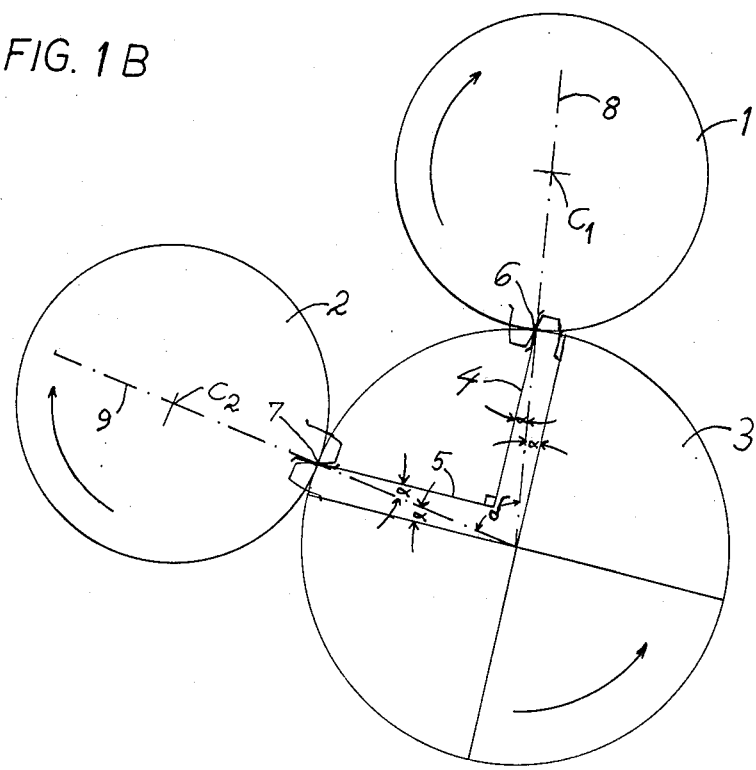

In FIG. 1A the driving gear 1 is shown to rotate counterclockwise, as does the driven gear 2; in FIG. 1B these two gears rotate in the clockwise direction. Gears 1–3 have been represented in these Figures by their pitch circles having centers $C_1$, $C_2$, $C_3$.

The common diameter of gears 1 and 3, represented by a line 8 passing through centers $C_1$ and $C_3$, includes a central angle $\delta$ with the common diameter of gears 2 and 3, represented by a line 9 passing through centers $C_2$ and $C_3$. In the positions illustrated in FIGS. 1A and 1B, line 8 also passes through a point 6 which is the point of contact between the active flank of a tooth of gear 1 and the confronting flank of a tooth of gear 3. Similarly, line 9 passes through a point of contact 7 between the active flank of a tooth of gear 2 and a confronting flank of a tooth of gear 3. The tangents 4 and 5 to the tooth flanks at these points of contact include with each other an angle here shown to be exactly 90°. They also include a pressure angle $\alpha$ with the corresponding common diameter 8 or 9.

In FIG. 1A, where $\delta$ also marks the arc traversed by a tooth of the clockwise-rotating idler gear 3 in passing from driving gear 1 to driven gear 2, $\delta \approx 90° + 2\alpha$. In FIG. 1B, where the arc traversed by a tooth of the counterclockwise-rotating gear 3 in moving from driving gear 1 to driven gear 2 equals $360° - \delta$, we find that $\delta \approx 90° - 2\alpha$. Thus, the gear trains in FIGS. 1A and 1B satisfy the relationship $\delta \pm 2\alpha \approx 90°$, with the zone $2\alpha$ determined by the direction of rotation, which represents the optimum arrangement for reasons that will now be explained with reference to FIG. 2.

Figure 2:
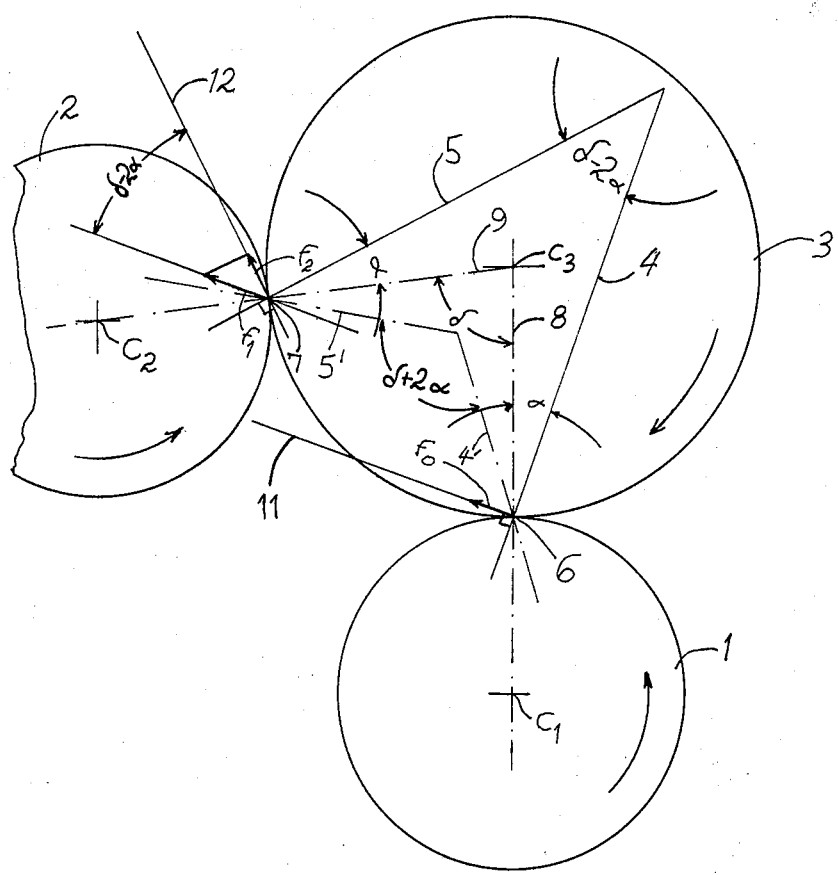
FIG. 2 is a similar schematic view serving to explain the geometric relationships of the gears in FIGS. 1A and 1B.

The gears in FIG. 2 are shown rotating in the same direction as in FIG. 1A, i.e. counterclockwise in the case of gears 1, 2 and clockwise in the case of gear 3. Here, however, the central angle $\delta$ included by common diameters 8 and 9 has been intentionally shown much smaller than in FIG. 1A; tangents 4 and 5, intersecting at a point 10, therefore define an acute angle $\delta - 2\alpha$ deviating by more than 50° from a right angle. Any irregularity in the tooth profile of gear 1, and/or any inexactitude in the mounting of that gear, will give rise to a lateral force $f_0$ in a direction perpendicular to the tangent 4, i.e. along a line 11. At the point of contact 7 between the teeth of gears 2 and 3 this stress component generates a force $f_1$ whose vector, it will be noted, includes an angle $\delta - 2\alpha$ with a line 12 lying normal to the tangent 5. The component $f_2$ of this force along the flank normal 12 has a magnitude $$f_2 \approx f_1 \cos(\delta - 2\alpha)$$

which goes to zero for $\delta - 2\alpha \approx 90°$.

If, therefore, the angles $\alpha$ and $\delta$ are interrelated as described with reference to FIG. 1A, any radial shifting of idler gear 3 due to such a lateral force $f_0$ will occur in a tangential direction with reference to the engaged tooth of gear 2 so as not to exert any lateral stress upon same. By the same token, any irregularity in the tooth profile and/or mounting of gear 2 will not subject the gear 1 to unbalanced stresses.

It will be readily apparent that the same holds true for the arrangement of FIG. 1B.

Figure 3:
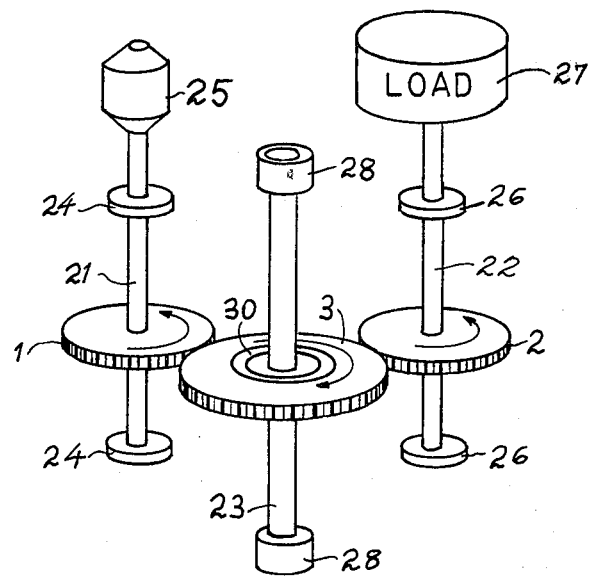
FIG. 3 is a perspective view of a gear train embodying the principles explained with reference to the preceding Figures.
Figure 4:
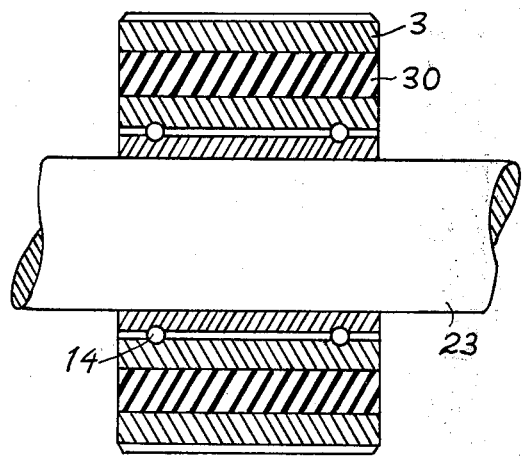
FIG. 4 is a cross-sectional view of an idler gear included in the gear train of FIG. 3, shwoing details of its mounting. showing

In FIGS. 3 and 4 the idler gear 3 is supported, through the intermediary of ball bearings 14 and an elastic ring 30, on a shaft 23 which is journaled in fixed bearings 28. This mode of mounting allows the gear 3 to shift limitedly in any radial direction within its plane; ring 30 alone affords a limited swivelability relative to that plane.

We claim:
1. A planar gear train comprising:
   a driving spur gear on an input shaft;
   a driven spur gear on an output shaft parallel to said input shaft;
   an idler gear having teeth in mesh with respective teeth of said spur gears, all said gears lying in a common plane of rotation transverse to said shafts; and
   yieldable mounting means for said idler gear enabling limited radial shifting thereof in said plane;
   the teeth of said spur gears having flanks engaging the teeth of said idler gear at points of contact each lying on a common diameter of said idler gear and the respective spur gear, the tangents to the flanks of the teeth of said driving and driven spur gears at said pressure points being generally perpendicular to each other.

2. A gear train as defined in claim 1 wherein said mounting means comprises an elastic support.

3. A gear train as dedined in claim 1 wherein said common diameters include with each other a central angle $\delta$ and include with each of said tangents a pressure angle $\alpha$, said central angle $\delta$ being substantially equal to $90° \pm 2\alpha$ with the sign of $2\alpha$ determined by the direction of rotation.

4. A gear train as defined in claim 3 wherein said pressure angle $\alpha$ is on the order of 20°.

5. A gear train as defined in claim 1 wherein said idler gear has a radius substantially exceeding that of each of said spur gears.

* * * * *